United States Patent
Morimoto et al.

(10) Patent No.: US 7,894,975 B2
(45) Date of Patent: Feb. 22, 2011

(54) COMBUSTION CONTROL DEVICE AND METHOD FOR CONTROLLING COMBUSTION OF ENGINE

(75) Inventors: Youhei Morimoto, Kariya (JP); Akikazu Kojima, Gamagori (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/428,717

(22) Filed: Apr. 23, 2009

(65) Prior Publication Data

US 2009/0266336 A1 Oct. 29, 2009

(30) Foreign Application Priority Data

Apr. 24, 2008 (JP) .............................. 2008-113973

(51) Int. Cl.
*F02D 41/30* (2006.01)
(52) U.S. Cl. ...................................... 701/108; 123/435
(58) Field of Classification Search ......... 701/103–105, 701/111, 108–109; 123/435, 305, 406.22, 123/406.41, 406.47; 73/35.12, 114.16, 114.69, 73/114.71, 114.74
See application file for complete search history.

(56) References Cited

U.S. PATENT DOCUMENTS

| | | | |
|---|---|---|---|
| 6,283,096 B1 | 9/2001 | Kimura | |
| 7,207,316 B2 * | 4/2007 | Moriya et al. | 123/435 |
| 7,347,185 B2 * | 3/2008 | Moriya et al. | 123/435 |
| 7,669,583 B2 * | 3/2010 | Moriya | 123/406.22 |
| 7,693,646 B2 * | 4/2010 | Moriya | 701/111 |
| 2002/0011240 A1 | 1/2002 | Kimura | |

FOREIGN PATENT DOCUMENTS

| | | | |
|---|---|---|---|
| JP | 11-125141 | | 5/1999 |
| JP | 2004-190539 | * | 7/2004 |
| JP | 2009-264217 | * | 11/2009 |
| JP | 2010-90848 | * | 4/2010 |

* cited by examiner

*Primary Examiner*—Hai H Huynh
(74) *Attorney, Agent, or Firm*—Nixon & Vanderhye P.C.

(57) ABSTRACT

A combustion control device is configured to control combustion in a combustion chamber of a compression ignition engine. An index detection unit is configured to detect multiple combustion state indices each indicating a combustion state in the combustion chamber. The multiple combustion state indices may include an ignition time point and an MFB50 time point, at which a combustion mass rate becomes 50% of total. A determination unit is configured to select a combustion state index from the multiple combustion state indices based on a determination condition such as an operation state of the engine. A control unit is configured to manipulate a parameter of the combustion state such as a fuel injection time point, at which a fuel injection valve injects fuel, so as to control the combustion state index at a target value.

20 Claims, 5 Drawing Sheets

COMBUSTION CONTROL DEVICE AND METHOD FOR CONTROLLING COMBUSTION OF ENGINE

CROSS REFERENCE TO RELATED APPLICATIONS

This application is based on and incorporates herein by reference Japanese Patent Application No. 2008-113973 filed on Apr. 24, 2008.

FIELD OF THE INVENTION

The present invention relates to a combustion control device for controlling combustion in a cylinder of a compression ignition engine. The present invention further relates to a method for controlling combustion of a compression ignition engine.

BACKGROUND OF THE INVENTION

For example, US 2002/0011240 A1 (JP-A-11-107820)), discloses control of a combustion state in a cylinder of a compression ignition engine such as a diesel engine by manipulating an amount of exhaust gas recirculation (EGR), which returns into the cylinder. Further, a combustion control, in which EGR is increased to reduce emission of NOx, is developed so as to comply with a tightened emission regulation. However, combustion in a cylinder may become unstable when EGR is increased, and consequently a combustion time point may vary relative to a target value. For example, when the combustion time point, which indicates a combustion state, varies, emission cannot be controlled at a desirable exhaust state. Further, an application of an engine of a low compression ratio, which is capable of reducing emission of NOx, is also researched. However, compared with an engine of a normal compression ratio, fuel burns under a condition of low cylinder temperature in an engine of a low compression ratio. Therefore, combustion in the cylinder becomes unstable, and a combustion time point varies relative to a target value. In such an engine, the combustion time point may further vary due to change in environmental conditions such as fuel quality, intake-air temperature, or atmospheric pressure.

For example, JP-A-11-125141 discloses detection of cylinder pressure using a pressure sensor, detection of the ignition time point as an index, which indicates a combustion state, based on the cylinder pressure, and control of an ignition time point at a target value by manipulating the fuel injection time point based on the detected ignition time point. However, in a specific engine operation state or an injection pattern, the ignition time point cannot be detected based on the cylinder pressure. More specifically, when fuel injection quantity is small or pilot injection is close to main injection in a multi-stage injection, the ignition time point is not detectable based on the cylinder pressure.

It is conceived to detect a mass fraction burned 50 time point (MFB50 time point), at which a combustion mass fraction in a cylinder becomes 50% of total in one burning cycle, as an index, which indicates a combustion state of the ignition time point, based on the cylinder pressure. In this case, the MFB50 is controlled at a target value by manipulating the fuel injection timing. The MFB50 is detected by calculating a summation of a combustion mass in one burning cycle based on cylinder pressure. The MFB50 is a combustion time point at which the summation becomes 50% of total of the combustion mass and detectable based on the cylinder pressure, regardless of a specific engine operation state or an injection pattern. The MFB50 is detected from the summation of the combustion mass. Therefore, the MFB50 is apt to be influenced by detection error of the pressure sensor, and hence lower in detection accuracy compared with the ignition time point. Thus, the combustion state is hardly controlled based on one index such as the ignition time point or the MFB50, which has a detection characteristic with merits and demerits.

SUMMARY OF THE INVENTION

In view of the foregoing and other problems, it is an object of the present invention to produce a combustion control device capable of controlling a combustion state by arbitrarily selecting an index, which has a suitable detection characteristic, from multiple combustion state indices, which indicate a combustion state. It is another object of the present invention to produce a method for controlling the combustion state.

According to one aspect of the present invention, a combustion control device for controlling combustion in a cylinder of a compression ignition engine, the combustion control device comprises index detection means for detecting a plurality of combustion state indices each indicating a combustion state in the cylinder. The combustion control device further comprises the combustion control device further comprises determination means for selecting a combustion state index from the plurality of combustion state indices based on a determination condition. The combustion control device further comprises the combustion control device further comprises control means for manipulating a parameter of the combustion state and controlling the combustion state index at a target value.

According to another aspect of the present invention, a method for controlling combustion in a cylinder of a compression ignition engine, the method comprises detecting a plurality of combustion state indices each indicating a combustion state in the cylinder. The method further comprises selecting a combustion state index from the plurality of combustion state indices based on a determination condition. The method further comprises manipulating a parameter of the combustion state for controlling the selected combustion state index at a target value.

BRIEF DESCRIPTION OF THE DRAWINGS

The above and other objects, features and advantages of the present invention will become more apparent from the following detailed description made with reference to the accompanying drawings. In the drawings.

The above and other objects, features and advantages of the present invention will become more apparent from the following detailed description made with reference to the accompanying drawings. In the drawings.

DETAILED DESCRIPTION OF PREFERRED EMBODIMENTS

Fuel Injection System 20

Figure 1:
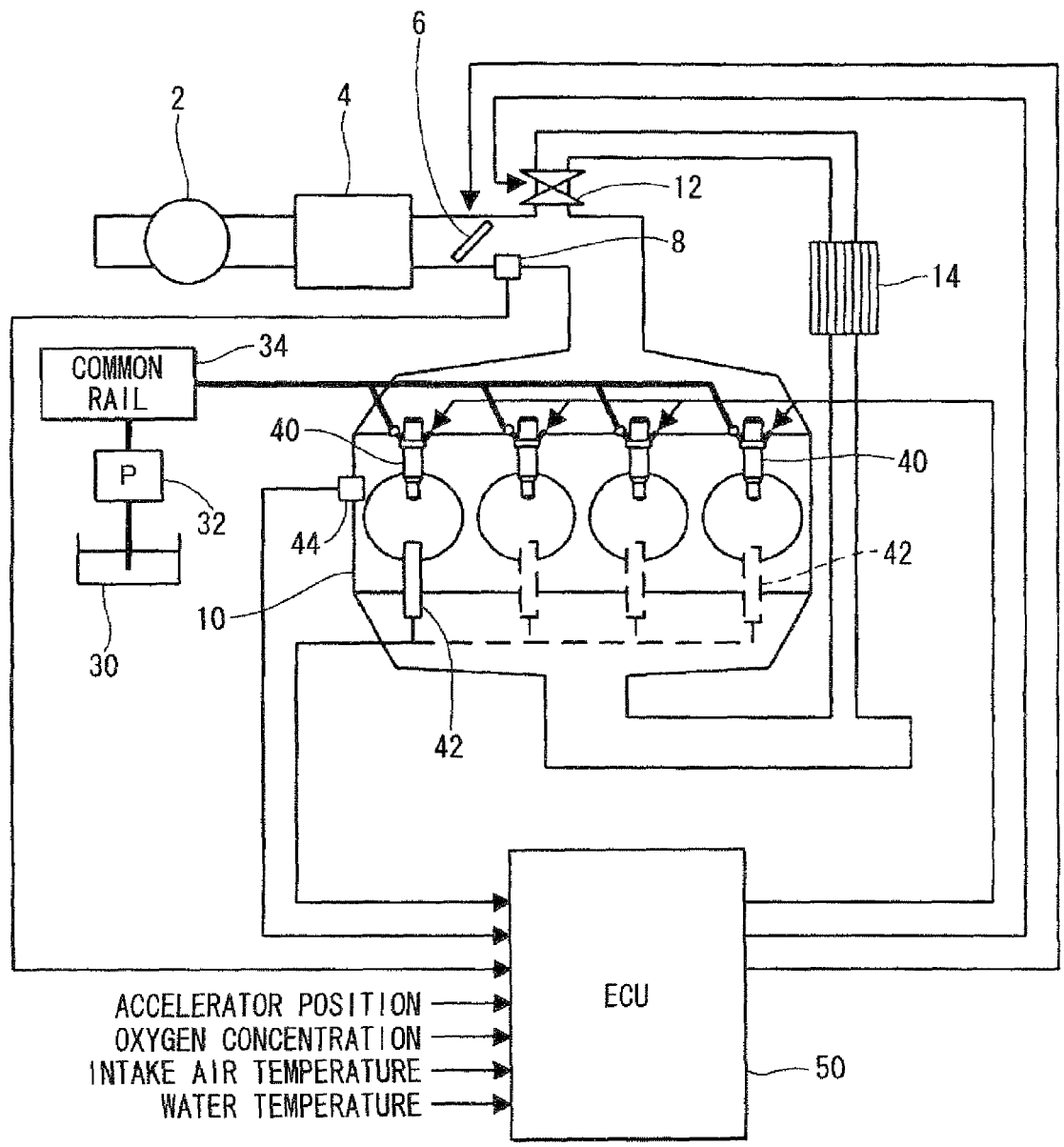
FIG. 1 is a schematic view showing a fuel injection system according to an embodiment.

As shown in FIG. 1, a pressure-accumulation fuel injection system 20 according to the present embodiment includes a high-pressure pump 32, a common rail 34, a fuel injection valve 40, a combustion pressure sensor (CPS) 42, and an electronic control unit (ECU) 50. The fuel injection system 20 supplies fuel to a diesel engine 10, which is a multi-cylinder engine such as a 4-cylinder diesel engine. A compressor 2 compresses intake air and supplies the compressed air through an intercooler 4. An intake throttle valve 6 controls an intake volume of the compressed intake air. Each cylinder of the engine 10 draws the intake air after passing through the intake throttle valve 6. When load of the engine 10 is low, the intake throttle valve 6 is throttled so as to further draw exhaust gas recirculation gas (EGR gas) into the engine 10. Alternatively, the intake throttle valve 6 is maintained substantially at a full open state so as to increase an amount of intake air drawn into the engine 10 and reduce pumping loss when the load of the engine 10 is high. Pressure of intake air drawn into the engine 10 is detected by an intake air pressure sensor 8. The EGR valve 12 controls flow of exhaust gas, which is discharged from the engine 10 and cooled through the EGR cooler 14. The exhaust gas is thus returned to an intake device such as an air intake pipe. The high-pressure pump 32 may be a generally-known pump in which a plunger is movable back and forth in response to rotation of a cam of a camshaft for pressurizing fuel, which is drawn from the fuel tank 30 into a compression chamber. The ECU 50 manipulates an electric current supplied to a metering valve (not shown) of the high-pressure pump 32, and thereby metering an amount of fuel drawn into the high-pressure pump 32 in a suction stroke. Whereby, an amount of fuel discharged from the high-pressure pump 32 is controlled by metering the amount of drawn fuel. The common rail 34 accumulates fuel supplied from the high-pressure pump 32 and thereby maintains fuel pressure at predetermined high pressure according to an operation state of the engine 10. Pressure (common rail pressure) in the common rail 34 is controlled according to an amount of fuel discharged from the high-pressure pump 32. The fuel injection valve 40 is provided to each cylinder of the engine 10 for injecting fuel, which is accumulated in the common rail 34, into the cylinder. The fuel injection valve 40 performs multi-stage injection, which includes, for example, pilot injection, main injection, post-injection, and the like within one burning cycle of the engine 10. The fuel injection valve 40 may be a generally-known electromagnetic valve, which controls fuel injection quantity by manipulating pressure in a control chamber, which applies fuel pressure to a nozzle needle in a closing direction. The CPS 42 is a pressure sensor, which detects pressure in the cylinder of the engine 10. As shown by the solid and dotted lines in FIG. 11 the CPS 42 may be provided to each of the four cylinders. Alternatively, as shown by the solid line in FIG. 1, the CPS 42 may be provided only to one cylinder. An NE sensor 44 detects rotation speed of the engine 10. In addition to the above sensors, various sensors such as an accelerator sensor for detecting an accelerator position, an O2 sensor for detecting an oxygen concentration of exhaust gas, a water temperature sensor for detecting temperature of cooling water of the engine 10 are provided.

The ECU 50 functions as an automatic combustion control system. For example, the ECU 50 is a microcomputer including a CPU, a RAM, a ROM, a flash memory, and the like (none shown). The ECU 50 manipulates electricity supplied to the metering valve of the high-pressure pump 32 and the fuel injection valve 40 based on an engine operation state, which is obtained from sensor signals of the various sensors such as the intake air pressure sensor 8, the CPS 42, the NE sensor 44, and the like. Thus, the ECU 50 controls the engine 10 in an optimal operation state. The ECU 50 controls a fuel injection time point and fuel injection quantity of the fuel injection valve 40 based on the engine operation state detected from the various sensors. The ECU 50 outputs an injection pulse signal as an injection instruction signal for controlling a fuel injection time point and the fuel injection quantity of the fuel injection valve 40. Specifically, as a pulse width of the injection pulse signal increases, a time period, in which the control chamber of the fuel injection valve 40 is communicated to a low-pressure side such as the combustion chamber of the engine 10, increases, and thereby the fuel injection quantity increases. The ECU 50 stores a fuel injection quantity characteristic, which indicates a relationship between the pulse width of the injection pulse signal and the fuel injection quantity, as a map for each common rail pressure (injection pressure) in a storage device such as a ROM or a flash memory.

In a multi-stage injection, the ECU 50 outputs the injection pulse signal to the fuel injection valve 40 so as to instruct the fuel injection time point and the fuel injection quantity for each of the pilot injection and the main injection. The ECU 50 performs a feedback control by manipulating the fuel injection time point based on a difference between an actual ignition time point of the main injection and a target ignition time point or a difference between an actual value of MFB50 (actual MFB50) and a target value of MFB50 (target MFB50). In the feedback control performed by manipulating the fuel injection time point, the ECU 50 performs a parallel shift processing of the fuel injection time point in the multi-stage injection including the pilot injection and the main injection to an advance side or a retard side. Each of the ignition time point and the MFB50 is a combustion state index, which indicates the combustion time point as a combustion state. The fuel injection time point is a parameter used in control of the combustion state. The ECU 50 operates as following means by executing a control program stored in a storage device such as the ROM or the flash memory.

(Index Detection Means)

Figure 2:
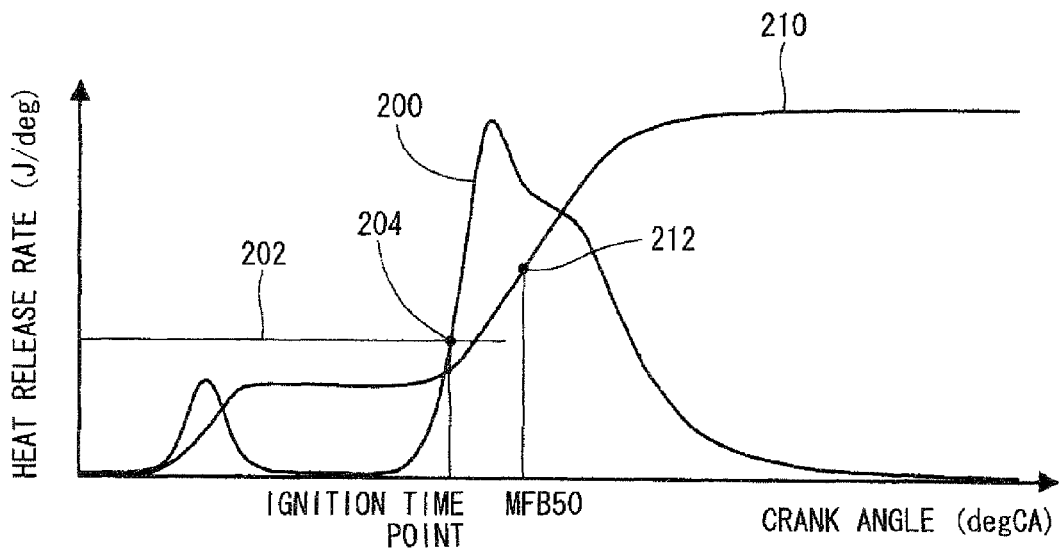
FIG. 2 is a time chart showing characteristics of a heat release rate and an MFB50.

FIG. 2 shows a heat release rate 200 when the main injection is performed, and the pilot injection is performed in advance of the main injection. The ECU 50 calculates the heat release rate 200 from the following formula (1) using the cylinder pressure, which the CPS 42 detects. The ECU 50 detects the MFB50 and the ignition time point of ignition caused by the main injection based on the heat release rate 200 calculated from the formula (1).

$$\text{Heat release rate} = (V \cdot dP + \kappa \cdot P \cdot dV)/(\kappa - 1) \tag{1}$$

In the formula (1), V, P, κ respectively indicate a cylinder volume, the cylinder pressure detected by the CPS 42, and the specific heat ratio.

The ECU 50 detects a crank angle 204, when the heat release rate 200 increases to be greater than a predetermined threshold 202 by ignition of fuel supplied by the main injection, as an ignition time point of ignition caused by the main injection. The heat release rate 200 may increase to be greater than the threshold 202 by ignition supplied by fuel of the pilot injection, in addition to the main injection. In this case, the ECU 50 detects a time point, at which the heat release rate 200 increases again to be greater than the threshold 202 in one burning cycle, as the ignition time point caused by the main injection. The ECU 50 calculates a summation of the heat release rate until the predetermined crank angle at which combustion completes subsequent to fuel injection in one burning cycle. Transition of the summation of the heat release rate 210 is shown in FIG. 2. The ECU 50 detects the crank angle 212, which corresponds to 50% of the total summation of the heat release rate 210 as the MFB50. The MFB50 is a mass fraction burned 50 time point (MFB50 time point), which corresponds to the crank angle at which a combustion mass rate in the cylinder becomes 50% of total in one burning cycle.

(Determination Means)

The MFB50 is the combustion time point, which corresponds to 50% of the total summation of the heat release rate in one burning cycle. Therefore, the MFB50 is detectable irrespective of detection states such as a small heat release rate. The summation of the heat release rate greatly varies when the output signal of the CPS 42 fluctuates in dependence upon, for example, a temperature characteristic of the CPS 42. When the summation of the heat release rate greatly varies, detecting accuracy based on the summation is significantly lowered. On the other hand, the ignition time point is detected based on the determination whether the heat release rate quickly changes and becomes greater than the predetermined threshold 202 when fuel is ignited in the cylinder. Therefore, compared with the MFB50, the ignition time point is detectable based on the determination with high accuracy even when the output signal of the CPS 42 varies.

Figure 3:
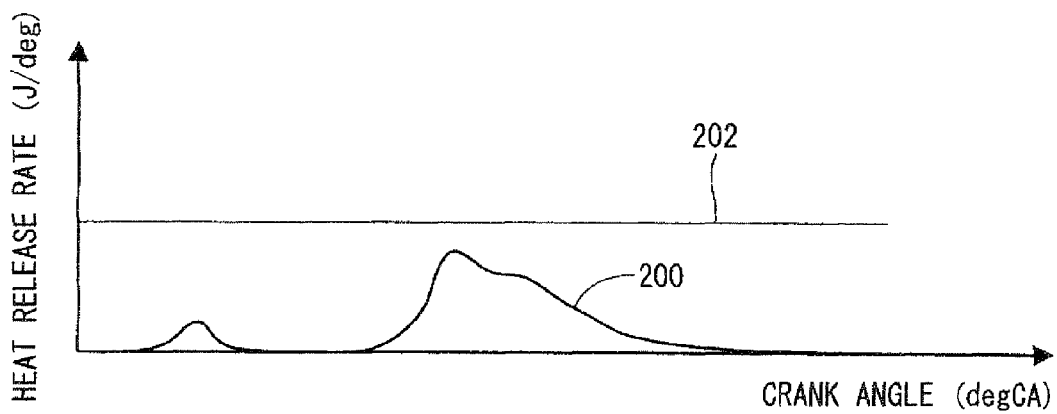
FIG. 3 is a time chart showing a characteristic of the heat release rate.

FIG. 3 shows a condition in which the heat release rate 200 is small, and the maximum value of the heat release rate 200 is less than the predetermined threshold 202. In this case, the heat release rate does not become greater than the predetermined threshold 202, and hence the ignition time point is undetectable. Therefore, when the maximum value of the heat release rate 200 is less than the predetermined threshold 202, the ECU 50 selects not the ignition time point but the MFB50 as the combustion state index. Alternatively, when the maximum value of the heat release rate 200 is greater than the predetermined threshold 202, the ECU 50 selects not the MFB50 but the ignition time point as the combustion state index.

Figure 4A:
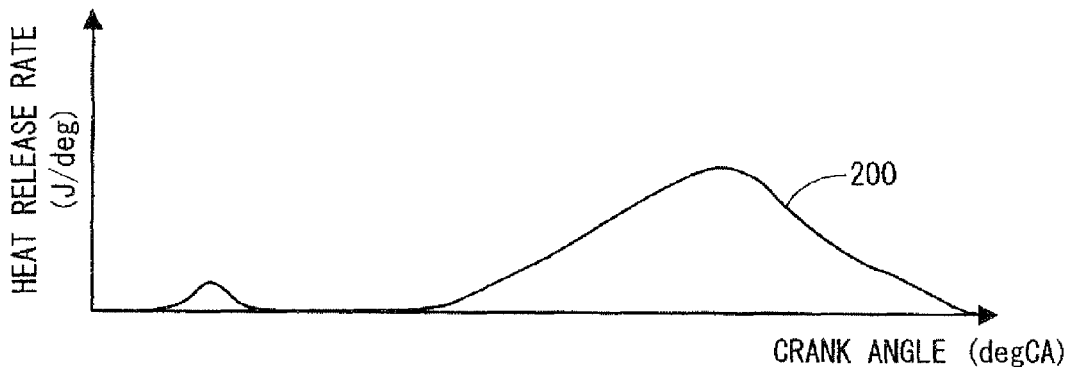
FIGS. 4A to 4C are time charts each showing a characteristic when inclination of the heat release rate changes.
Figure 4B:
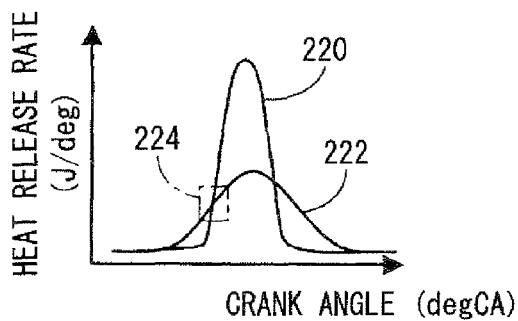
Figure 4C:
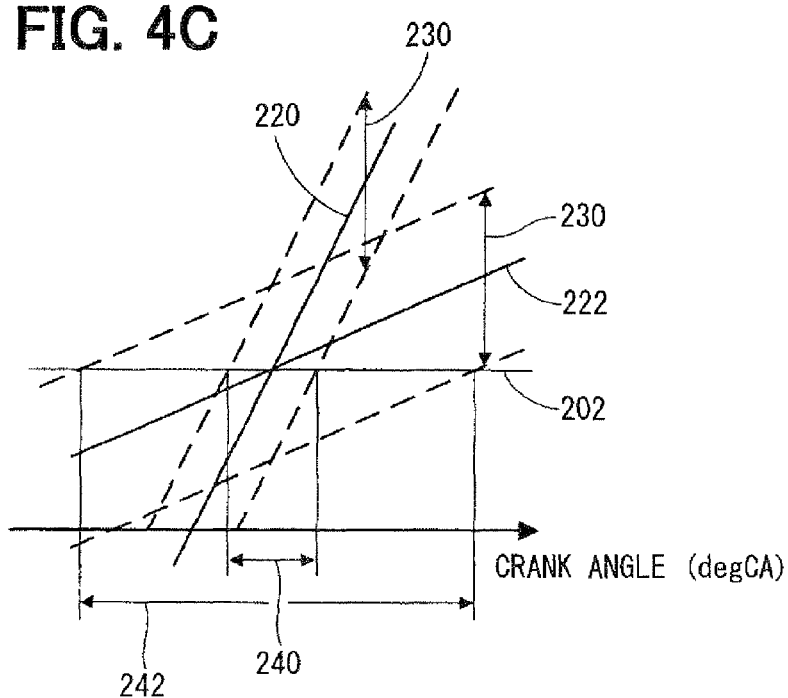

As shown in FIG. 4A, when the inclination of the heat release rate 200 is gentle, i.e., small, the heat release rate 200 slowly changes. In this case, the detecting accuracy of the ignition time point is low. The reason will be described below. In FIGS. 4B, 4C, the solid line 220 indicates a characteristic when the inclination of the heat release rate is greater than the predetermined value, and the solid line 222 indicates a characteristic when the inclination of the heat release rate is less than or equal to the predetermined value. FIG. 4C is an enlarged view of a portion 224 in FIG. 4B. It is assumed that the heat release rates indicated by the solid lines 220, 222 and calculated by the formula (1) have the same degree of a detection error 230. FIG. 3C indicates a comparison between the detection errors 240, 242 of the crank angle (ignition time point) with respect to the predetermined threshold 202 in the range of the detection error 230 of the heat release rate. The crank angle has the detection error 242 when the inclination of the heat release rate shown by the solid line 222 is less than or equal to the predetermined value. The crank angle has the detection error 240 when the inclination of the heat release rate shown by the solid line 220 is greater than the predetermined value. According to the present comparison, the detection error 242 of the crank angle is greater than the detection error 240 of the crank angle. Therefore, as indicated by the solid line 222, when the ignition time point is detected from the heat release rate in the case where the inclination of the heat release rate is less than or equal to the predetermined value, the detection accuracy of the ignition time point may be lower than that of the detection on the basis of the MFB50. Therefore, when the inclination of the change in heat release rate 200 is less than or equal to the predetermined value, the ECU 50 selects the detection based on the MFB50 instead of the detection based on the ignition time point. Alternatively, when the inclination of the change in heat release rate 200 is greater than the predetermined value, the ECU 50 selects the detection based on the ignition time point instead of the detection based on the MFB50.

Thus, the ECU 50 determines the following conditions (1), (2) and arbitrary selects the ignition time point or the MFB50 as the index of the target combustion time point when performing the feedback control of the ignition time point by manipulating the fuel injection time point.

(1) The maximum value of the heat release rate 200 is less than or equal to the threshold 202.

(2) The inclination of the heat release rate 200 is less than the predetermined value.

As follows, conditions for the determination to select the MFB50 instead of the ignition time point as the index of the target combustion time point in the feedback control by manipulating the fuel injection time point will be described in detail. When at least one of the following conditions (1), (2) is satisfied, the ECU 50 selects the MFB50 instead of the ignition time point as the index. Alternatively, when all the following conditions (1), (2) are not satisfied, the ECU 50 selects the ignition time point instead of the MFB50 as the index.

(1) The maximum value of the heat release rate 200 is less than the threshold 202. Specifically, (a) the maximum value of the heat release rate 200 calculated from the formula (1) is actually less than the threshold 202, or (b) the engine operation state of the engine is within a predetermined condition. More specifically, when a target fuel injection quantity of the fuel injection valve 40, which is calculated based on the rotation speed of the engine and the accelerator position, is less than or equal to a predetermined value, the maximum value of the heat release rate 200 correspondingly becomes less than the threshold 202. Consequently, the ECU 50 determines the ignition time point to be undetectable.

Figure 5:
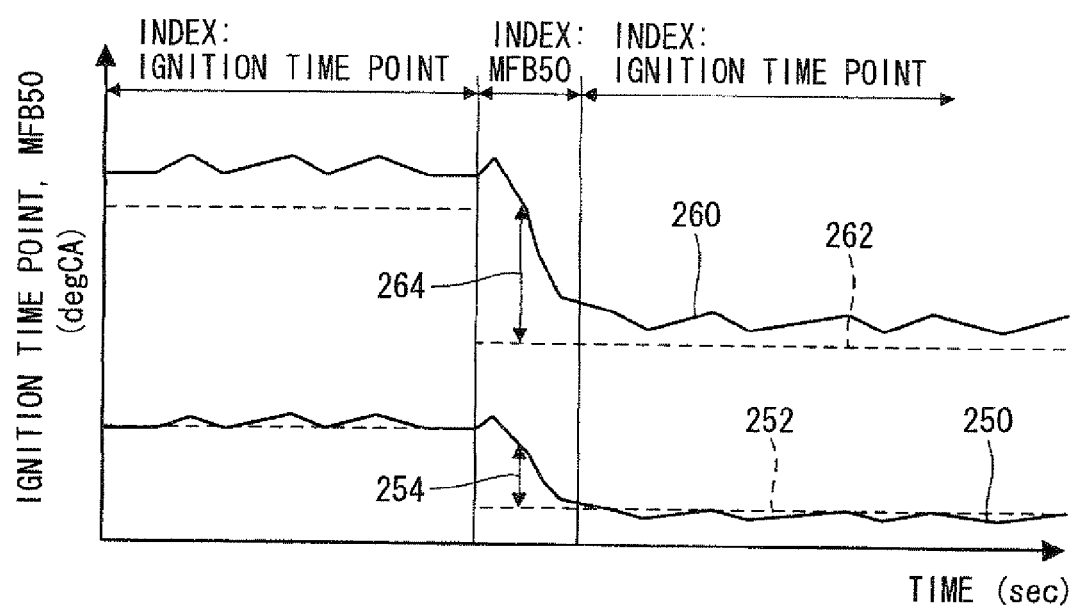
FIG. 5 is a time chart showing detected values and target values of an ignition time point and an MFB 50.

(2) The inclination of the heat release rate 200 is less than or equal to the predetermined value. Specifically, when one of the following conditions (a) to (f) is satisfied, fuel is hardly burned in the cylinder of the engine, and thereby the inclination of the heat release rate 200 becomes small. (a) As shown in FIG. 5, a deviation 254 between the ignition time point 250, which is detected from the heat release rate 200, and the target value 252 of the ignition time point is greater than or equals to a predetermined value. In addition, a deviation 264 between the and MFB50, which is indicated by the solid line 260 and detected from the heat release rate 200, and a target value 262 of the MFB50 is greater than or equals to a predetermined value. The present condition is employed on the basis of a tendency that the ignition time point, which is detected from the heat release rate 200, and the MFB50 are retarded respectively relative to the target values, and the deviations 254, 264 become large, as the inclination of the heat release rate 200 becomes small. That is, when each of the deviations 254, 264 is large, inclination of the heat release rate 200 is small. For example, in FIG. 5, when at least one of the deviations 254, 264 is greater than or equal to the predetermined value, the ECU 50 selects the MFB50 as the index and performs the feedback control. Alternatively, when the deviations 254, 264 are less than the predetermined value, the ECU 50 selects the ignition time point as the index and performs the feedback control. (b) An EGR rate is greater than or equal to a predetermined value. (c) An oxygen concentration of exhaust gas is less than or equal to a predetermined value. In the conditions (b), (c), the air-fuel ratio is low, and consequently fuel does not easily burn. (d) The atmospheric pressure is equal to or less than a predetermined value. When the condition (d) is satisfied, an amount of intake air drawn into the cylinder of the engine decreases, and fuel does not easily burn. (e) Temperature of intake air is equal to or less than a predetermined value. When the condition (e) is satisfied, the temperature of intake air drawn into the cylinder of the engine decreases, and fuel does not easily burn. (f) Temperature of refrigerant such as cooling water of the engine 10 is equal to or less than a predetermined value. When the condition (f) is satisfied, the temperature of the refrigerant of the engine decreases, and fuel does not easily burn.

(Control Means)

The ECU 50 calculates the target ignition time point and the target MFB50 (target MFB50 time point) based on the engine operation state. When the determination means selects the ignition time point as the index, the ECU 50 feedback controls the ignition time point at the target ignition time point based on the deviation between the ignition time point, which is detected from the heat release rate 200, and the target ignition time point. When the determination means selects the MFB50 as the index, the ECU 50 feedback controls the MFB50 at the target MFB50 based on the deviation between the MFB50, which is detected from the heat release rate 200, and the target MFB50. In the present operations, the ignition time point or the MFB50 is feedback controlled at the target value by manipulating the fuel injection time point, and thereby emission of pollutants such as NOx can be reduced and controlled at a desirable state.

(Fuel Injection Time Point Control)

Figure 6:
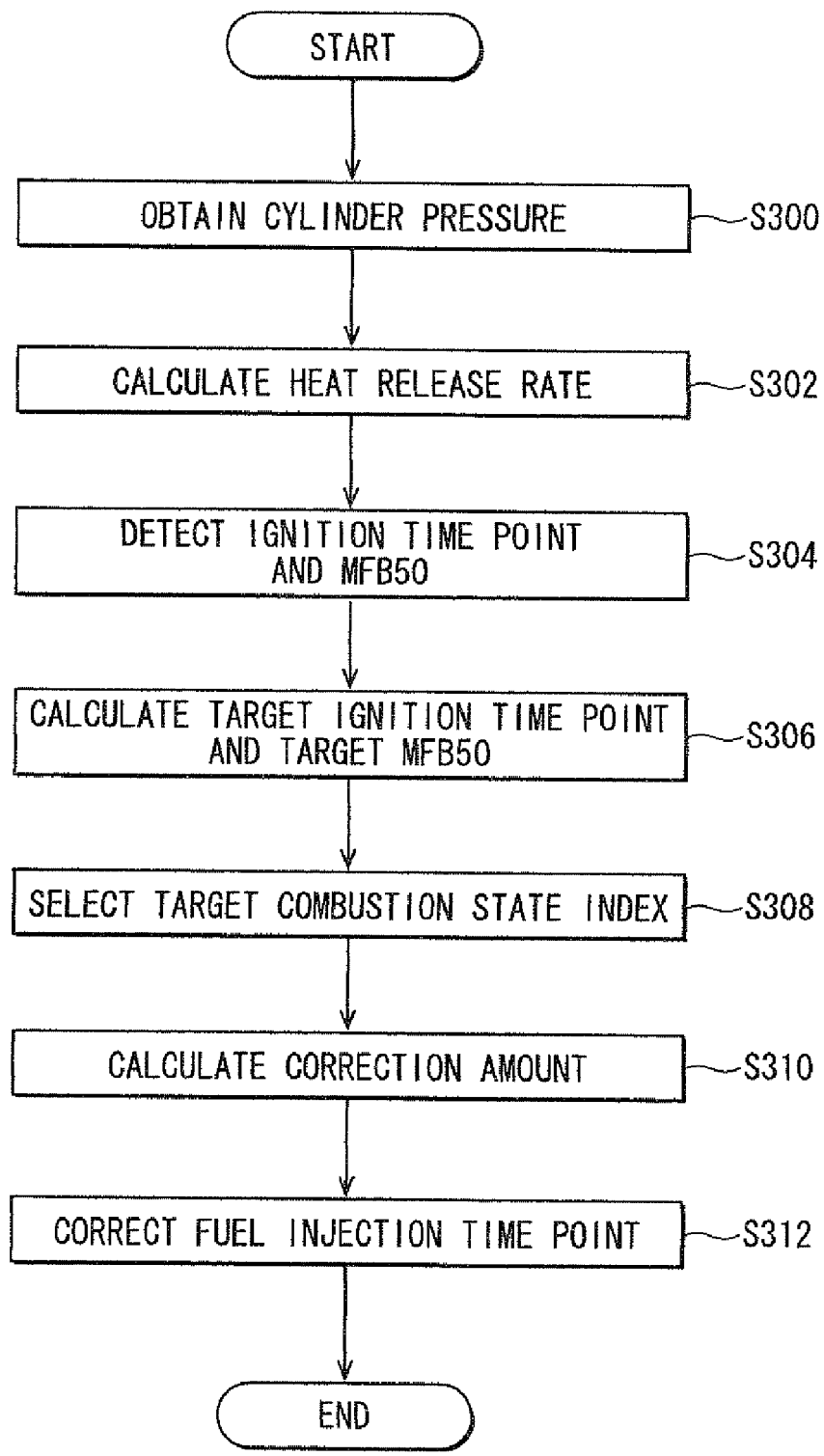
FIG. 6 is a flow chart showing a feedback control of the ignition time point.

As follows, the feedback control performed by manipulating the fuel injection time point of the fuel injection valve 40 will be described. In the present feedback control, the ignition time point or the MFB50 is selected as the index of the combustion time point, and the ignition time point or the MFB50, which is detected based on the heat release rate 200, is controlled at the target value by manipulating the fuel injection time point of the fuel injection valve 40. FIG. 6 is a flowchart showing a control processing of the fuel injection time point. The control processing shown in FIG. 6 is performed once in one burning cycle. In S300, the ECU 50 obtains the cylinder pressure from the detection signal of the CPS 42. In S302, the ECU 50 calculates the heat release rate from the formula (1). In S304, the ECU 50 detects the ignition time point and the MFB50 based on the heat release rate. In S306, the ECU 50 calculates the target ignition time point and the target MFB50 based on the engine operation state. In step S308, the ECU 50 determines the following conditions (1), (2) and arbitrary selects the ignition time point or the MFB50 as a target combustion state index when performing the feedback control by manipulating the fuel injection time point. (1) The maximum value of the heat release rate 200 is less than the threshold 202. (2) The inclination of the heat release rate 200 is less than the predetermined value. In S310, the ECU 50 calculates a correction amount of the fuel injection time point for the feedback control such as a PI control. The ECU 50 calculates the correction amount based on a deviation between the ignition time point or the MFB50, which is detected from the heat release rate in S304 and selected as the combustion state index in S308, and the target value calculated in S306. In S312, the ECU 50 corrects the fuel injection time point using the calculated correction amount. The fuel injection time point is corrected by performing a parallel shift processing of the fuel injection time point of each of the injections in the multi-stage injection.

According to the present embodiment, the ignition time point or the MFB50 is arbitrarily selected as the index of the combustion time point, which indicates the combustion state, based on the predetermined determination conditions. In the present operation, the ignition time point is selected when the ignition time point can be detected with high accuracy, and thereby the fuel injection time point is manipulated to perform the feedback control by setting the ignition time point, which is higher than the MFB50 in detection accuracy, as the index. Alternatively, the MFB50 is selected when the ignition time point cannot be detected with high accuracy, and thereby the fuel injection time point is manipulated to perform the feedback control by setting the MFB50 as the index. Thus, a condition, in which the feedback control cannot be performed by manipulating the fuel injection time point since the ignition time point cannot be detected, can be avoided. In addition, when the ignition time point is lower than the MFB50 in detection accuracy, feedback control performed by manipulating the fuel injection time point using the ignition time point as the index can be also avoided. According to the present embodiment, the ignition time point or the MFB50 is arbitrarily selected based on the predetermined determination conditions. Therefore, the feedback control can be performed with high accuracy by manipulating the fuel injection time point.

Other Embodiment

According to the embodiment, the ignition time point or the MFB50 is set as the index of the combustion time point, which indicates the combustion state in the cylinder of the engine. Alternatively, instead of the ignition time point, the maximum value of the heat release rate or an end time point of combustion, which is detected from the heat release rate, may be used as the index of the combustion time point, for example. Instead of the MFB50, another value may be used as the combustion state index. In this case, the actual combustion state can be controlled at a target combustion state based on one suitable combustion state index, which is arbitrarily selected from multiple combustion state indices by performing determination of the predetermined condition.

According to the embodiment, the ignition time point and the MFB50 are used as the combustion state indices, which indicate the combustion state in the cylinder of the engine. Alternatively, three or more indices, which indicate the combustion state, may be used for the feedback control. In this case, one index may be selected from the three or more indices based on the predetermined determination condition.

The above processings such as calculations and determinations are not limited being executed by the ECU 50. The control unit may have various structures including the ECU 50 shown as an example. In the embodiment, the ECU 50 has the control program and functions as the combustion state index detection means, the determination means, and the control means. Alternatively, at least a part of the function of the means may be produced with a hardware having a circuit structure.

The functions of the means may be produced using a hardware resource having functions specified by a circuit structure thereof a hardware resource having functions specified by a program, or a combination of the hardware resources. The functions of the means are not limited to be produced using hardware resources, which are physically individual from each other. That is, the above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

The invention is not limited to the embodiments described above but is applicable to various embodiments within a scope not departing from the gist thereof. That is, various modifications and alternations may be diversely made to the above embodiments without departing from the spirit of the present invention.

What is claimed is:

1. A combustion control device for controlling combustion in a cylinder of a compression ignition engine, the combustion control device comprising:
    index detection means for detecting a plurality of combustion state indices each indicating a combustion state in the cylinder;
    determination means for selecting a combustion state index from the plurality of combustion state indices based on a determination condition; and
    control means for manipulating a parameter of the combustion state and controlling the combustion state index at a target value.

2. The combustion control device according to claim 1, wherein the control means is configured to manipulate a fuel injection time point, at which a fuel injection valve injects fuel, as the parameter.

3. The combustion control device according to claim 1, wherein the index detection means is configured to detect the plurality of combustion state indices based on a detection signal of a pressure sensor, which is for detecting pressure in the cylinder.

4. The combustion control device according to claim 3, wherein the index detection means is configured to detect the plurality of combustion state indices each indicating a combustion time point.

5. The combustion control device according to claim 4,
    wherein the index detection means is configured to calculate a heat release rate in the cylinder based on the detection signal of the pressure sensor,
    the index detection means is configured to detect an ignition time point and an MFB50 time point, at which a combustion mass rate becomes 50% of total, as the plurality of combustion state indices based on the heat release rate, and
    the determination means is configured to select one of the ignition time point and the MFB50 time point based on the determination condition.

6. The combustion control device according to claim 5, wherein the determination means is configured to select one of the ignition time point and the MFB50 time point based on at least one of an accelerator position and an engine rotation speed as the determination condition.

7. The combustion control device according to claim 5, wherein the determination means is configured to select one of the ignition time point and the MFB50 time point based on a maximum value of the heat release rate in the cylinder as the determination condition.

8. The combustion control device according to claim 5, wherein the determination means is configured to select the one of the ignition time point and the MFB50 time point based on one of a deviation between the ignition time point and a target value and a deviation between the MFB50 time point and a target value as the determination condition.

9. The combustion control device according to claim 5, wherein the determination means is configured to select one of the ignition time point and the MFB50 time point based on an EGR rate as the determination condition.

10. The combustion control device according to claim 5, wherein the determination means is configured to select one of the ignition time point and the MFB50 time point based on an oxygen concentration in exhaust gas as the determination condition.

11. The combustion control device according to claim 5, wherein the determination means is configured to select one of the ignition time point and the MFB50 time point based on atmospheric pressure as the determination condition.

12. The combustion control device according to claim 5, wherein the determination means is configured to select one of the ignition time point and the MFB50 time point based on intake air temperature as the determination condition.

13. The combustion control device according to claim 5, wherein the determination means is configured to select one of the ignition time point and the MFB50 time point based on water temperature of the engine as the determination condition.

14. The combustion control device according to claim 5, wherein the determination means is configured to select one of the ignition time point and the MFB50 time point based on inclination of the heat release rate in the cylinder as the determination condition.

15. A method for controlling combustion in a cylinder of a compression ignition engine, the method comprising:
    detecting a plurality of combustion state indices each indicating a combustion state in the cylinder;
    selecting a combustion state index from the plurality of combustion state indices based on a determination condition; and
    manipulating a parameter of the combustion state for controlling the combustion state index at a target value.

16. The method according to claim 15, wherein the parameter is a fuel injection time point, at which a fuel injection valve injects fuel.

17. The method according to claim 15, wherein the detecting further includes:
    estimating the plurality of combustion state indices based on pressure in the cylinder.

18. The method according to claim 17, wherein each of the plurality of combustion state indices indicates a combustion time point.

19. The method according to claim 18,
    wherein the estimating further includes:
    calculating a heat release rate in the cylinder based on the pressure in the cylinder;
    obtaining an ignition time point and an MFB50 time point, at which a combustion mass rate becomes 50% of total, as the plurality of combustion state indices based on the heat release rate,
    wherein the selecting further includes:
    selecting one of the ignition time point and the MFB50 time point based on the determination condition.

20. The method according to claim 19, wherein the determination condition includes at least one of:
    at least one of an accelerator position and an engine rotation speed;

a maximum value of the heat release rate in the cylinder;
one of a deviation between the ignition time point and a target value and a deviation between the MFB50 time point and a target value;
an EGR rate;
an oxygen concentration in exhaust gas;
atmospheric pressure;
intake air temperature;
water temperature of the engine; and
inclination of the heat release rate in the cylinder.

* * * * *